United States Patent [19]

van Roosmalen et al.

[11] 3,883,773

[45] May 13, 1975

[54] DEVICE COMPRISING A TELEVISION CAMERA TUBE

[75] Inventors: Johannes Hendrikus Theodorus van Roosmalen, Joannes Cornelis Vermulst, both of Emmasingel, Eindhoven, Netherlands

[73] Assignee: U.S. Philips Corporation, New York, N.Y.

[22] Filed: July 9, 1970

[21] Appl. No.: 53,419

[30] Foreign Application Priority Data

July 11, 1969 Netherlands ....................... 6910673

[52] U.S. Cl. ................ 315/10; 315/11; 315/31 TY

[51] Int. Cl. ............................................ H01j 31/26

[58] Field of Search .................... 315/10, 11, 31 TY

[56] References Cited

UNITED STATES PATENTS 3,440,476 4/1969 Crowell et al. ........................ 315/10

3,474,286 10/1969 Hergenrother.................... 315/11 X 3,504,211 3/1970 Takemoto et al. ............. 315/31 TY 3,548,250 12/1970 van Roosmalen................. 315/11 X

*Primary Examiner*—Benjamin R. Padgett

*Assistant Examiner*—P. A. Nelson

*Attorney, Agent, or Firm*—Frank R. Trifari; Henry I. Steckler

[57] ABSTRACT

A device having a television camera tube in which an electron beam, moving under the influence of line and frame deflection means, scans the target plate, during scans to return the potential of the target plate to the cathode potential and during the flybacks to return the potential of the target plate to a higher potential, in which an additional deflection member is operated during line flybacks to produce an extra deflection of the beam to direct the returning beam to places on the target plate where said beam can be particularly effectively operative.

7 Claims, 5 Drawing Figures

INVENTORS
JOHANNES H.T. VAN ROOSMALEN
BY JOANNES C. VERMULST

AGENT

INVENTORS
JOHANNES H.T. VAN ROOSMALEN
BY JOANNES C. VERMULST
AGENT

INVENTORS
JOHANNES H.T. VAN ROOSMALEN
BY JOANNES C. VERMULST

AGENT

DEVICE COMPRISING A TELEVISION CAMERA TUBE

The invention relates to a device comprising a television camera tube which tube has a target plate for integrating the picture information of a scene to be recorded and an electron gun for producing an electron beam directed towards the target plate, said electron gun comprising a cathode, a control grid and an acceleration anode, a diaphragm being present in said tube between the control grid and the target plate to limit the electron beam, said device comprising a focusing lens to focus the electron beam onto the target plate and deflection means for periodically scanning the target plate by the electron beam limited by the said diaphragm for stabilising the potential of the target plate at substantially the cathode potential for producing output signals corresponding to the integrated picture information, said deflection means comprising a line deflection member for line scans and line fly-backs and a frame deflection member for frame scans and frame fly-backs.

The said stabilisation involves that an amount of charge per unit time is supplied by the electron beam to surface elements of the target plate which amount is equal to the amount conducted away as a result of the picture information in such manner that the potential of the surface elements is periodically reduced to substantially the cathode potential.

In such a device it is normal to fully suppress the electron beam in the electron gun during the flybacks so that only in the line scans which do not fall in a frame flyback electrons can reach the target plate. During the scanning of the target plate the electron beam is limited for the greater part by the diaphragm so that only a central part of the electron beam can reach the target plate. This is necessary so as to obtain, at the area of the target plate, a beam of sufficient current intensity and small diameter to ensure a good resolving power.

In a known device of the type mentioned in the first paragraph the television camera tube is a "Plumbicon". The target plate in this device consists of a photoconductive layer of at least mainly lead monoxide which is provided on a transparent signal plate. The signal plate is connected to the terminal of a voltage source through a signal resistor. This terminal has a positive potential relative to the cathode. The free surface of the target plate faces the electron gun. The scene to be recorded is projected onto the target plate through the signal plate and causes, in elementary regions of the target plate, a photocurrent the value of which depends upon the incident light intensity so that the potential of the free surface of the elementary regions is increased in accordance with the incident light intensity. The scanning by the electron beam stabilizes said potential to cathode-potential, the resulting potential fluctuations appearing across the signal resistor as output signals. The characteristic of the photocurrent as a function of the incident light flux is substantially linear. This has the advantage that in the case of normal illumination output signals are obtained which linearly depend upon the illumination intensity.

The linearity of the said characteristic, however, also involves a few drawbacks. Excessive light intensity gives rise to unstabilized places on the target plate of the television camera tube because the electron beam is not capable of supplying sufficient electrons to stabilise said places. Moving high-intensity lights, for example, glow-discharge lights, flashlights and the like, give rise to particularly annoying effects, for example, comet-tail effects.

These drawbacks may also present themselves in other devices of the type mentioned in the first paragraph, for example, in a device in which the scene to be recorded is projected onto a target plate constructed from a number of silicon diodes which are discharged in accordance with the light flux, and in a device, for example, in which the light from the scene to be recorded produces a photoelectron current which is incident on the target plate and produces therein a conductivity induced by electron bombardment.

It is the object of the invention to provide a device in which the said drawbacks are mitigated.

A device comprising a television camera tube, which tube has a target plate for integrating the picture information of a scene to be recorded and an electron gun for producing an electron beam directed towards the target plate, said electron gun comprising a cathode, a control grid and an acceleration anode, a diaphragm for limiting the electron beam being present in said tube between the control grid and the target plate, said device comprising a focusing lens to focus the electron beam of the target plate and deflection means for periodically scanning the target plate by the electron beam limited by the said diaphragm for stabilisation of the potential of the target plate at substantially the cathode potential for producing output signals corresponding to the integrated picture information, said deflection means comprising a line deflection member for line scans and line flyback and a frame deflection member for frame scans and frame flybacks, comprises, according to the invention, a lens element which is connected to a first pulse generator for producing, during field and/or line flybacks, a beam cross-over substantially at the area of the said diaphragm, comprises a second pulse generator for producing simultaneously a cathode potential which is increased relative to the potential of the target plate, and comprises an additional deflection member which is connected to a third pulse generator for producing during flybacks an extra deflection of the electron beam.

It is to be noted that the term lens element is to be considered in a wide sense so that any element which contributes to a magnetic or electrostatic lens field, for example, any electrode of the electron gun, can be considered to be included.

It is furthermore to be noted that the term pulse generator is used here in that sense that it cannot only be a known generator for producing pulses but that it may also be an element which derives in known manner a pulse from an available pulse, for example, from a deflection fly-back pulse.

In applicant's U.S. Pat. No. 3,548,250 a device has already been proposed of the type mentioned in the first paragraph which comprises a lens element which is connected to a first pulse generator for producing, during flybacks, a beam cross-over substantially at the area of the diaphragm and a second pulse generator for producing simultaneously a cathode potential which is increased relative to the potential of the target plate. In the proposed device a large number of electrons are available, during fly-backs, for auxiliary stabilisation of places on the target plate struck by excessive light intensity, by concentration of electrons originating from the cathode with comparatively increased potential relative to the target plate in a cross-over substantially at the area of the diaphragm, which places cannot be stabilized during line scans by the comparatively small number of electrons then available. The auxiliary stabilisation is a stabilisation to increased cathode-potential so that said auxiliary stabilisation only influences places struck by excessive light intensity, in other words, so that the picture information integrated at places which are not struck by excessive light intensity during the flybacks is not erased but supplies correct output signals during the line scans corresponding to the integrated picture information. In such a device generally a considerable part of the electrons placed available in the fly-back time is not effectively used. If, for example, the target plate is scanned in behalf of the auxiliary stabilisation during the line flybacks, the centres of the line scans and the line fly-backs lie substantially one on the other and the activity of half of the beam current in the flyback time leaves much to be desired because half the beam actually comes to late relative to the sweep beam. Similar drawbacks are mitigated by the device improved according to the invention in which the electron beam, when the same is active in behalf of the auxiliary stabilisation, is directed towards places on the target plate where said beam can be more effectively operative by means of the said additional deflection means and the said third pulse generator.

In order that the invention may be readily carried into effect, it will now be described in greater detail, by way of example, with reference to the accompanying drawings, in which.

Figure 1:
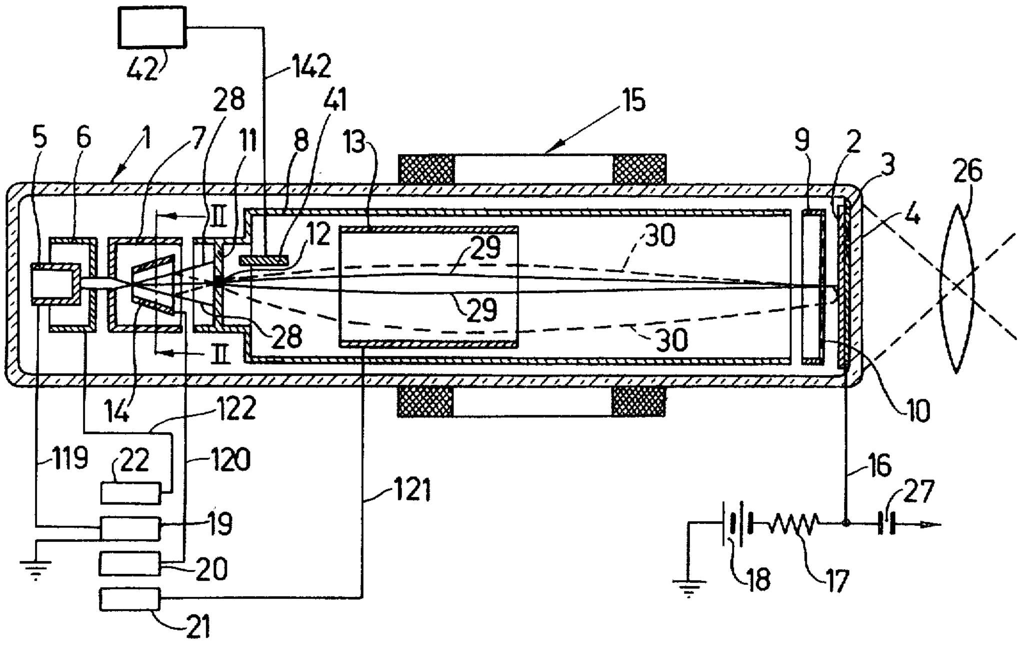
FIG. 1 is an example of the device according to the invention, in which the television camera tube is a longitudinal cross-sectional view of a "Plumbicon"

The camera tube shown in FIG. 1 comprises an evacuated cylindrical envelope 1 of glass. The tube comprises a target plate 2 which consists of a layer of substantially lead monoxide which is vapour-deposited on a signal plate 3 which consists of a very thin layer of a readily conducting tin oxide provided on the inside of the window 4 formed by one end of the envelope. Within the envelope 1 near the other end of the envelope is situated the rotationally-symmetric electron gun which is coaxial with the envelope and consists of the cathode 5, the control grid 6, and the cylindrical acceleration anode 7. Between the acceleration anode 7 and the target plate 2 are a second cylindrical anode 8 and an electrically conductive gauze 10 provided on a cylindrical electrode 9. Inside the second cylindrical anode 8 is the diaphragm 11 having an aperture 12 and connected in an electrically conductive manner to the cylindrical anode 8. Furthermore, a focusing electrode 13 which, in cooperation with the second cylindrical anode 8, forms a focusing lens is situated within the second cylindrical anode. A tubular lens electrode 14 is present in the cylindrical anode 7, which electrode is conical and widens towards the diaphragm 11. The connection means of the electrodes and various supply conductors to the electrodes are not shown in the Figures. The tube is partly surrounded by line deflection coils and frame deflection coils, collectively denoted by 15. Between the diaphragm 11 and the target plate 2 is the additional deflection member formed by the deflection plate 41 for electrostatic deflection. The signal plate 3 is connected through a supply conductor 16 passed through the envelope 2 and the signal resistor 17 to one terminal of a voltage source 18, the other terminal of which is connected to earth. Pulse generators 19, 20, 21, 22 and 42 with the supply conductors 119, 120, 121, 122 and 142 are diagrammatically denoted.

During operation the electrodes have the following direct voltage potentials:

the cathode 5:0 volt.
the control grid 6: between −100 volt and 0 volt,
the first anode 7:300 volt,
the second anode 8:300 volt
the electrodes 9 and 10:600 volt.
the signal electrode 3:45 volt.
the focusing electrode 13:100 volt.
the electrode 14:100 volt. (on an average)
the deflection plate 41:300 volts.

The scene to be recorded is projected, by means of an optical system diagrammatically denoted by a lens 26, onto the target plate 2 of the tube through the window 4 and the signal plate 3. During line scans the free surface of the target plates 2 is scanned according to a rectangular frame by the electron beam produced by the electron gun. The surface is stabilized at substantially the potential of the cathode, electric signals being formed which are derived from the signal resistor 17 via the capacitor 27. The electron current between the cathode 5 and the diaphragm 11 the variation of which is denoted by the solid lines 28 is partly received by the diaphragm 11. Only the central portion of the beam denoted by the solid lines 29 is used for said scanning.

During line flybacks the pulse generator 19 supplies a positive pulse of 5 volts to the cathode 5. Simultaneously the pulse generator 20 supplies a negative pulse of 80 volts to the electrode 14. As a result of this a beam cross-over of the beam denoted by the broken lines 30 is effected at the area of the diaphragm aperture 12, and a large current is available for stabilisation to 5 volts. Simultaneously the pulse generator 42 supplies a negative pulse of 25 volts to the deflection element 41, as a result of which the beam, during flybacks, experiences an extra deflection (downwards in the Figure) so that the returning beam comes exactly below the scanning beam on the target plate. The pulse generator 21 may be provided to supply pulses for readjusting the focusing lens during fly-backs. The pulse generator 22 may be provided for supplying pulses to adjust the operating point of the electron gun optimally during flybacks.

Figure 2:
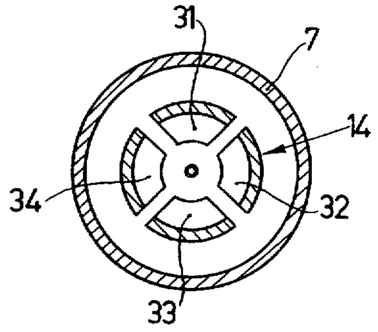
FIG. 2 is a cross-sectional view taken on the line II—II of FIG. 1.

As is shown in FIG. 2, the lens element 14 consists of four sectors 31, 32, 33 and 34 which are electrically separated in the axial direction. The sectors 31 and 33 are connected to the terminals of a variable direct voltage source not shown. The sectors 32 and 34 are also connected to the terminals a direct voltage source not shown. The electron beam can be centered by adjusting the variable voltages of the voltage sources.

Figure 3:
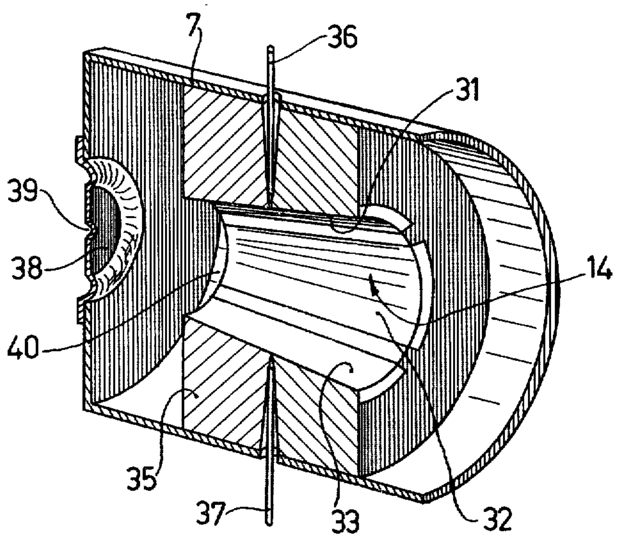
FIG. 3 is a perspective cross-sectional view of a lens construction of the tube shown in FIG. 1, FIGS. 4 and 5 show the scanning of the target plate by the electron beam in the device shown in FIG. 1.

The elements 7 and 14 may be constructed as is shown in detail in FIG. 3. In FIG. 3, the acceleration anode 7 comprises a conductive foil 38 in which an aperture 39 is provided. The lens element 14 is formed by an electrically conductive coating consisting of four sectors, for example, of molybdenum and manganese, provided on a central conical aperture 40 of a ceramic support provided inside the acceleration anode 7, which support closely fits within the acceleration anode 7. The four sectors of the conductive coating of which only 31, 32 and 33 are visible in FIG. 3, each have an electric supply passed through an aperture in the acceleration anode 7 and through the support 35. In the Figure the supply 36 of the sector 31 and the supply 37 of the sector 33 are visible. The construction shown in FIG. 3 enables a very accurate and simple assembly.

Figure 4:
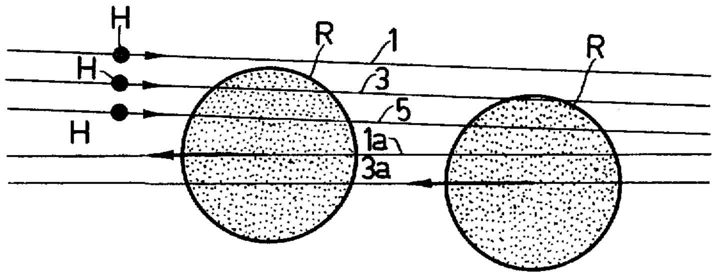
Figure 5:
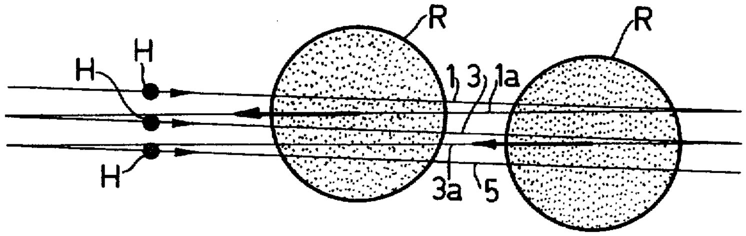

FIG. 4 shows diagrammatically the movement of the electron beam over the target plate. The electron beam moves successively in the direction of the arrows shown along the lines 1, 1*a*, 3, 3*a* and 5, and over the surface of the target plate. The lines 1, 3 and 5 are scanning lines, the lines 1*a* and 3*a* are flyback lines. During flybacks the returning beam R which, as is shown, has a much wider scanning area than the scanning beam H, is deflected so that the returning beam becomes located substantially entirely in front of the scanning beam in the next scan. For comparison FIG. 5 shows the situation which would present itself if the beam were not influenced by the additional deflection element. Approximately half of the beam which scans the line 1*a* would then be situated above the beam which scans the line 3 and come too late to supply an optimum contribution to the auxiliary stabilisation.

Although only one example of the device according to the invention has been described above with reference to the accompanying drawing, it will be obvious to those skilled in the art that many other constructions are possible without departing from the scope of this invention. The additional deflection means, for example, may consist of a conductive coating which is provided on the wall of the tube opposite to an aperture provided in the second anode. It is pointed out in particular that the additional deflection means can advantageously form part of a tubular element divided into sectors in a manner analogous to the lens element 14 in FIG. 2, and placed within a cylindrical anode, for example, a second anode as 8 in FIG. 1, and that in particular when using a magnetic focusing lens which in itself can produce the desirable focusing with difficulty only. By means of such an element and suitable pulse generators, an optimum defocusing of the electron beam in the flyback time can be produced in addition to the desirable additional deflection. Of course, constructions can be given in which the additional deflection member is a magnetic deflection member. The tube may also be of a different type. The tube may have, for example, a target plate constructed from silicon diodes, or a target plate in which a conductivity is produced which is induced by the bombardment of photoelectrons. It is pointed out in particular that the places towards which the electron beam is directed in the flybacks under the influence of the additional deflection member and the said third pulse generator can be chosen differently in various manners from the example described, in which the returning beam is shifted substantially entirely to a place which is scanned just thereafter by the scanning beam. The device may comprise, for example, an electromagnetic focusing lens comprising a pulse generator to vary the current through the focusing lens during flybacks, and a pulse generator to supply pulses to the additional deflection elements to compensate for the rotation of the scanning lines caused by the variation of the said current. The third pulse generator may also be constructed, for example, in such manner that the flyback lines in the frame flyback period, the greatest number of which usually lie at the top in the picture, are shifted to, for example, the centre of the picture for applications in which the excessive light intensity is to be expected mainly in the centre of the picture. The device may, for example, also be constructed so that the third pulse generator is controlled by the information from the scene and supplies pulses formed on the basis of the information of the scene to the additional deflection member which controls the electron beam during flybacks during the places having an intensive high light level.

What is claimed is:

1. A device comprising a television camera tube, which tube has a target plate for integrating the picture information of a scene to be recorded and an electron gun for producing an electron beam directed towards the target plate, said electron gun comprising a cathode, a control grid and an acceleration anode, a diaphragm being present in said tube between the control grid and the target plate to limit the electron beam, said device comprising a focusing lens to focus the electron beam onto the target plate, and deflection means for periodically scanning the target plate by the said diaphragm-limited electron beam for stabilisation of the potential of the target plate at substantially the cathode potential for producing output signals corresponding to the integrated picture information, said deflection means comprising a line deflection member for line scans and line flybacks and a frame deflection member for frame scans and frame flybacks, characterized in that the device comprises a lens element connected to a first pulse generator for producing, during flybacks, a beam cross-over substantially at the area of the said diaphragm and a second pulse generator for producing simultaneously a cathode potential which is increased relative to the potential of the target plate, and an additional deflection member connected to a third pulse generator for producing during flybacks an extra deflection of the electron beam.

2. A device as claimed in claim 1, characterized in that the additional deflection member is constituted by at least a part of a tubular element arranged inside the tubular electrode, which element comprises electrically separated conductive sectors extending in the axial direction, said element being connected to means for supplying to the element voltage pulses to produce the said extra deflection and to defocus the beam during flybacks.

3. A device as claimed in claim 1 characterized in that the said third pulse generator is a pulse generator for supplying, during line flybacks, pulses to the additional deflection means for shifting during a line flyback substantially the whole width of the beam to a place which is scanned just afterwards by the scanning beam.

4. A device as claimed in claim 1 characterized in that the said focusing lens is an electromagnetic focusing lens provided with a pulse generator for varying the current through the focusing lens during flybacks and that the said third pulse generator is a pulse generator for supplying to the additional deflection member pulses to compensate for the rotation of the scanning lines as a result of the variation of the said current.

5. A device as claimed in claim 1 characterized in that the said third pulse generator is a pulse generator for supplying to the additional deflection member pulses to shift the flyback lines in the frame flyback time to a part of the target plate where mainly an excessive light intensity is to be expected.

6. A device as claimed in claim 1 characterized in that the said third pulse generator is a pulse generator for forming pulses derived from the output signals corresponding to the information of the scene and to be supplied to the additional deflection member to control the electron beam, during flybacks, to places on the target plate having an intensive high light level.

7. A television camera tube comprising an enclosure, an electron gun disposed at one end of said enclosure for emitting an electron beam, a target disposed at another end of said enclosure for receiving said electron beam, means for focusing said beam onto said target to produce a narrow spot during scanning intervals and for focusing said beam onto said target to produce a wide spot during flyback intervals, means for increasing said gun potential during flyback intervals, and means for supplying an extra deflection of said beam during flyback intervals.

* * * * *